(12) United States Patent
Kikuchi et al.

(10) Patent No.: US 8,411,422 B2
(45) Date of Patent: Apr. 2, 2013

(54) RESIN OVERCAP PROVIDED WITH IC TAG

(75) Inventors: Takayuki Kikuchi, Kanagawa (JP);
Takahiro Kurosawa, Kanagawa (JP);
Ken Sotobayashi, Kanagawa (JP);
Masayuki Mori, Kanagawa (JP); Kazuo Tanabe, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 330 days.

(21) Appl. No.: 12/993,012

(22) PCT Filed: Jun. 22, 2009

(86) PCT No.: PCT/JP2009/061292
§ 371 (c)(1),
(2), (4) Date: Nov. 16, 2010

(87) PCT Pub. No.: WO2009/154292
PCT Pub. Date: Dec. 23, 2009

(65) Prior Publication Data
US 2011/0063786 A1   Mar. 17, 2011

(30) Foreign Application Priority Data

Jun. 20, 2008   (JP) ................................. 2008-161978

(51) Int. Cl.
*G06F 1/16* (2006.01)

(52) U.S. Cl. .................... 361/679.01; 349/151; 257/738; 345/107

(58) Field of Classification Search ...................... 349/62, 349/147, 158, 61, 95, 187, 12, 138, 58, 150, 349/151; 430/204, 287.1, 286.1, 313, 285.1; 345/204, 211, 60, 206, 55, 107, 87, 100, 345/173; 361/679.01, 679.21, 679.22, 679.26, 679.27, 679.09, 749, 752, 779, 704; 257/737, 738, 741, 750, 668, 40; 340/572.8, 572.1; 455/575.8, 556.1; 206/701

See application file for complete search history.

(56) References Cited

U.S. PATENT DOCUMENTS

| 7,197,346 | B2 * | 3/2007 | Eromaki et al. | ........... 455/575.8 |
| 7,583,194 | B2 * | 9/2009 | Appalucci et al. | ......... 340/572.8 |
| 2009/0289769 | A1 | 11/2009 | Appalucci et al. | |
| 2009/0321302 | A1 * | 12/2009 | Dubois et al. | ................. 206/701 |

FOREIGN PATENT DOCUMENTS

| JP | 57-186346 U | 11/1982 |
| JP | 58-177362 U | 11/1983 |
| JP | 2005-321935 | 11/2005 |
| JP | 2007-230643 | 9/2007 |
| JP | 2008-515109 | 5/2008 |

* cited by examiner

*Primary Examiner* — Hung Duong
(74) *Attorney, Agent, or Firm* — Greenblum & Bernstein, P.L.C.

(57) ABSTRACT

[Problem] To provide a resin overcap provided with an IC tag that can be used as an overcap being fitted onto a metal cap and having an IC tag that is so provided that the transmission and reception of signals will not be disturbed by the metal cap.

[Means for Solution] A resin overcap used being fitted onto a metal cap, comprising a top panel and a cylindrical side wall hanging down from the circumferential edge of the top panel and in which the metal cap is fitted, wherein a step or a protrusion is formed on an upper portion on the inner surface of the cylindrical side wall to prevent the upward motion of the metal cap fitted in the cylindrical side wall, and an IC tag provided with an IC chip is mounted on the top panel in a manner of maintaining a predetermined distance D to a top plate of the metal cap fitted into the cylindrical side wall.

4 Claims, 5 Drawing Sheets

RESIN OVERCAP PROVIDED WITH IC TAG

TECHNICAL FIELD

This invention relates to a resin overcap provided with an IC tag storing product information. More specifically, the invention relates to a resin overcap provided with an IC tag that can be adapted to a metal cap.

BACKGROUND ART

Bar codes giving product information such as date of production, names of the producer and the distributor, term of validity, etc. have heretofore been widely used for a variety of kinds of products. Here, the bar codes are such that the coded information is read through a reader. Therefore, the surface where the bar codes are printed must be flat encountering limitations in the field of packing materials such as bottles and caps. There, further, remains a problem of limited amount of information that can be coded.

Recently, therefore, a technology for giving information by using an IC tag has been utilized. The IC tag is also called RFID (Radio Frequency Identification) and is a micro-communication terminal formed in the shape of a tag (label) obtained by burying an IC chip storing predetermined information together with a radio antenna in a dielectric material such as resin or glass. The IC tag is used for reading product information stored in the IC chip via radio communication and offers such an advantage that a memory in the IC chip is capable of storing data of, for example, several hundreds of bytes and, therefore, can store a lot of product information. Besides, the IC tag can be used for reading the recorded information in a non-contacting manner, is free of problem of wear caused by contact and, further, offers such advantages that it can be worked in a shape that meets the form of the product and in a small size with a decreased thickness.

For example, a patent document 1 discloses a cap in which an IC tag is buried in a top plate.

PRIOR ART DOCUMENT

Patent Document

Patent document 1: JP-A-2005-321935

OUTLINE OF THE INVENTION

Problems that the Invention is to Solve

As will be understood from the proposal disclosed in the patent document 1, however, the above-mentioned IC tag can be adapted to a resin cap but cannot be adapted to a metal cap. This is because the metal serves as a shield which disturbs the transmission and reception of signals. At present, therefore, it has been desired to utilize the IC tags for the metal caps, too.

It is, therefore, an object of the present invention to provide a resin overcap provided with an IC tag that can be used as an overcap being fitted onto a metal cap and having an IC tag that is so provided that the transmission and reception of signals will not be disturbed by the metal cap.

Means to Solve the Problems

According to the present invention, there is provided a resin overcap used being fitted onto a metal cap, comprising:

a top panel and a cylindrical side wall hanging down from the circumferential edge of the top panel and in which the metal cap is fitted;

wherein a step or a protrusion is formed on an upper portion on the inner surface of the cylindrical side wall to prevent the upward motion of the metal cap fitted in the cylindrical side wall; and an IC tag provided with an IC chip is mounted on the top panel in a manner of maintaining a predetermined distance D to a top plate of the metal cap fitted into the cylindrical side wall.

In the present invention, it is desired that:
(1) A knurling is formed on the inner surface of the cylindrical side wall at a position under the step;
(2) An engaging protrusion is formed on the inner surface of the cylindrical side wall so as to engage with the outer surface of a skirt of the metal cap; and
(3) The IC tag is so mounted on the top panel that the distance D is not less than 2 mm with respect to the top plate of the metal cap.

Effects of the Invention

The resin overcap of the invention is such that the metal cap is fitted inside the cylindrical side wall, and the IC tag is mounted on the outer surface or on the inner surface of the top panel. Here, the step or the protrusion is formed on the inner surface of the cylindrical side wall in which the metal cap is fitted. The step or the protrusion prevents the metal cap that is fitted from moving upward. As a result, a predetermined distance D is maintained between the IC tag mounted on the top panel and the top plate of the metal cap. Namely, since the predetermined distance D is maintained between the IC tag and the metal cap, transmission and reception of signals to and from the IC tag are not disturbed by the metal cap, making it possible to effectively utilize the IC tag such as inputting and outputting product information.

In the present invention, further, it is desired to provide a knurling at a portion under the step or the protrusion on the inner surface of the cylindrical side wall in which the metal cap is fitted. Provision of the knurling enables the metal cap to be easily fitted (capped) into the cylindrical side wall. Usually, further, a knurling for non-skid is formed on the outer surface of the skirt of the metal cap at an upper portion thereof, enabling the metal cap to be easily removed from the container nozzle when turned in the opening direction. Upon forming the knurling on the inner surface of the cylindrical side wall, too, the knurlings engage with each other. As a result, upon turning the overcap without being removed, the metal cap turns together therewith. Therefore, the metal cap can be removed from the container nozzle with the overcap being fitted thereon. Besides, the metal cap can be very easily turned in the opening direction, too.

From such a standpoint that the overcap fitted onto the metal cap is stably held without play and is prevented from escaping, further, it is desired to provide a protrusion on the inner surface of the cylindrical side wall to engage with the outer surface of the skirt of the metal cap.

MODE FOR CARRYING OUT THE INVENTION

IC Tag

Figure 1:
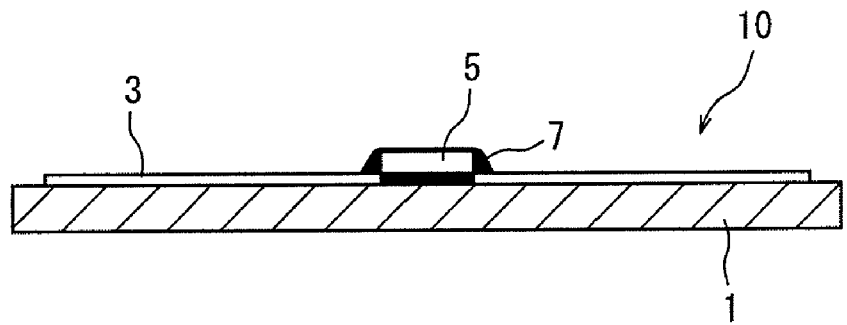
FIG. 1 is a side sectional view of an IC tag mounted on a resin overcap of the present invention.
Figure 2:
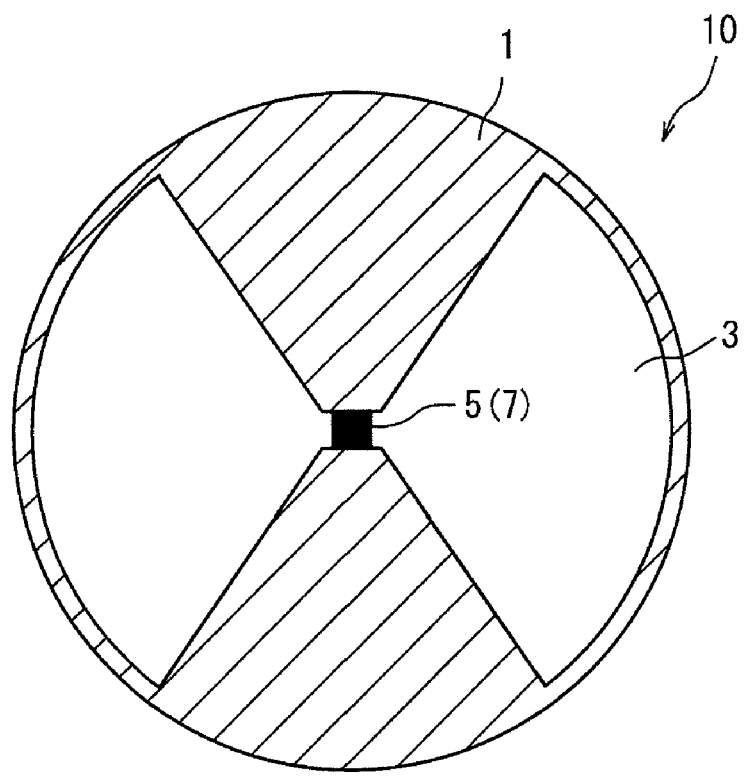
FIG. 2 is a plan view of the IC tag of FIG. 1.

Referring to FIGS. 1 and 2 showing the IC tag used in the invention, the IC tag generally designated at 10 includes a resin substrate 1. A metal antenna 3 and an IC chip 5 are fixed onto the surface of the resin substrate 1.

The resin substrate 1 is, usually, formed of a thermoplastic resin that can be melt-adhered by heating. Though there is no particular limitation on the thermoplastic resin, there is, usually, used the same resin as the resin substrate that constitutes the overcap on which the IC tag 10 is mounted. When, for example, the overcap made from a polyolefin is to be provided with the IC tag 10, it is desired that the resin substrate 1 is formed by using the polyolefin. There has, further, been placed in the market an IC tag 10 having the metal antenna 3 and the IC chip 5 provided on the polyethylene terephthalate resin substrate. In such a case, the resin substrate 1 can be formed by laminating a polyolefin resin layer such as polyethylene or polypropylene on the back surface of the polyethylene terephthalate resin substrate by using a suitable adhesive such as an acid-modified olefin resin.

The antenna 3, usually, comprises a thin film (about 5 to about 50 µm thick) of a low resistance metal such as aluminum, copper, silver or gold, has a predetermined pattern, and is used for transmitting and receiving signals. In this example as will be understood from FIG. 2, the metal antenna 3 is formed having a fan-shaped pattern with the IC chip 5 as a center.

The IC chip 5 is flip-chip mounted so as to be conductive to the antenna 3, stores information related to a product to which the IC tag 10 is attached, stores predetermined information upon receiving signals through the antenna 3 and, further, enables information stored in the IC tag 10 to be read out through the antenna 3.

As shown in FIG. 1, further, the IC chip 5 is, usually, protected upon being sealed with a sealing agent 7 such as polyimide or bismaleimide resin.

Further, the resin substrate 1 may have such a thickness that enables the antenna 3 to be formed on the surface thereof and the IC chip 5 to be mounted thereon. Namely, the resin substrate 1 may have a suitable thickness depending upon the form of being mounted on the overcap as described below. For instance, the resin substrate 1 may have a relatively small thickness when it is to be mounted on the overcap by heat-sealing on its back surface (surface on the side where the IC chip is not provided) or on its front surface on the portions where there is no metal antenna. The resin substrate 1, however, must have a relatively large thickness when it is to be mounted on the overcap on its side surface by heat-sealing or by fitting. From the above point of view, the resin substrate 1 has a thickness, usually, in a range of about 5 to about 1000 µm. Within this range, the resin substrate 1 has a suitable thickness depending upon the form of mounting.

Figure 6:
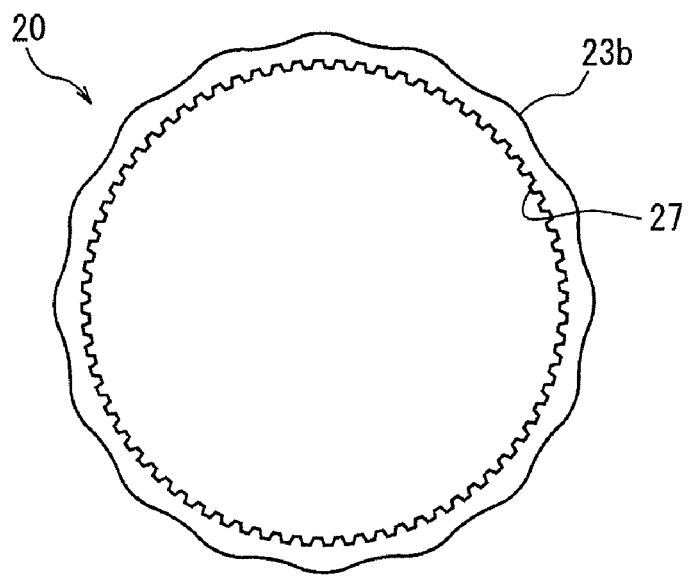
FIG. 6 is a view of the overcap along a cross-section A-A in FIG. 3.
Figure 7:
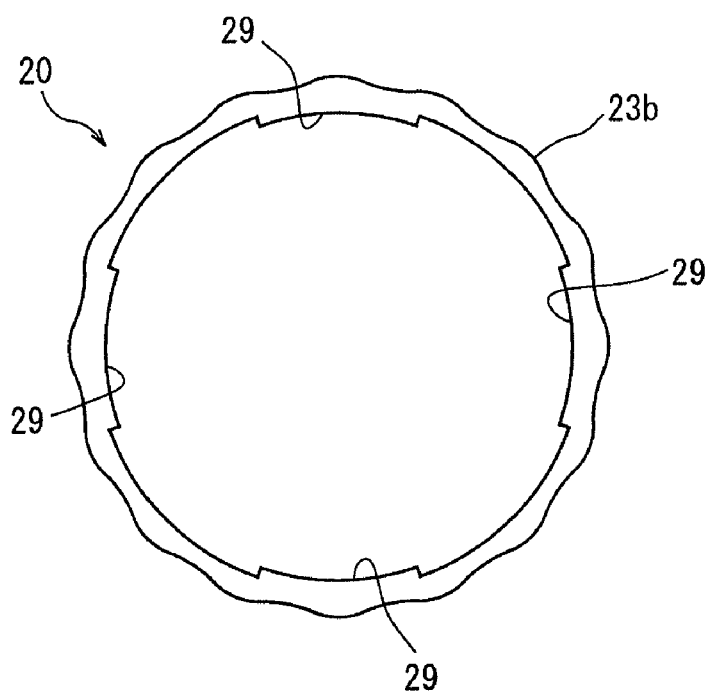
FIG. 7 is a view of the overcap along a cross-section B-B in FIG. 3.
Figure 8:
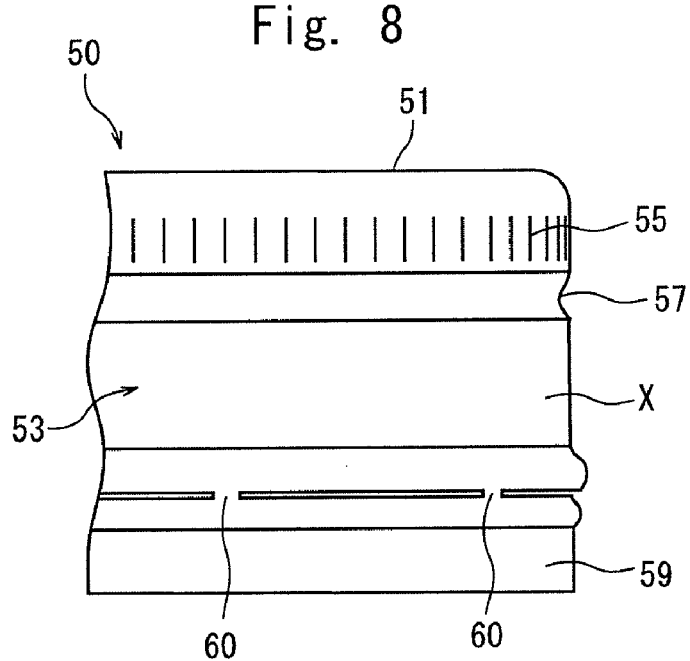
FIG. 8 is a schematic half-side view of a metal cap onto which the overcap of FIG. 3 will be fitted.

Referring to FIGS. 3 to 7, the overcap (generally designated at 20) is used being fitted onto a metal cap shown in FIG. 8 (designated at 50 in FIG. 8). Roughly speaking, the overcap 20 comprises a top panel 21 and a cylindrical side wall 23 hanging down from the circumferential edge of the top panel 21.

The overcap 20 is produced by compression-forming or injection-forming a thermoplastic resin. As the thermoplastic resin, there can be used olefin resins such as polyethylene, polypropylene, ethylene/propylene copolymer, polybutene-1, ethylene/butene-1 copolymer, propylene/butene-1 copolymer, and ethylene/vinyl acetate copolymer; as well as polystyrene, styrene/butadiene copolymer, ABS resin or polycarbonate. Among the above thermoplastic resins according to the present invention, there is preferably used a relatively soft polyethylene and, particularly, a low-density polyethylene from the standpoint of easy fitting onto the metal cap 50 (easily fitting the metal cap 50).

The above overcap 20 has the IC tag 10 mounted on the inner surface of the top panel 21. As described above, the mounting is accomplished by heat-sealing the resin substrate 1 of the IC tag 10 and the inner surface of the top panel 21 together or by fitting the IC tag 10 into a groove formed in the top panel 21. Thus, the IC tag 10 is firmly fixed to the inner surface of the top panel 21. Depending upon the cases, it is also allowable, as a matter of course, to place the IC tag 10 in the mold and in this state, the top panel 21 is provided with the IC tag 10 by the inner molding which is for forming the cap.

In the above example, the IC tag 10 is provided on the inner surface of the top panel 21. It is, however, also allowable to provide the IC tag 10 on the outer surface of the top panel 21. Further, though there is no particular limitation on the direction of the IC tag 10, it is, usually, desired that the IC tag 10 is so provided that the IC chip 5 faces the top panel 21.

Figure 3:
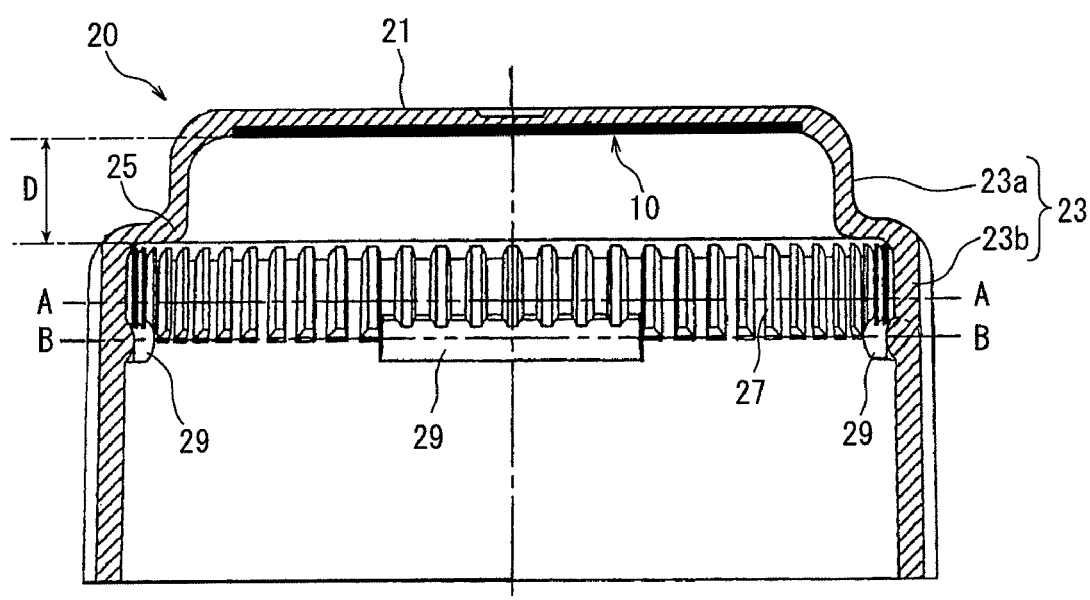
FIG. 3 is a side sectional view showing an example of the resin overcap of the invention.
Figure 4:
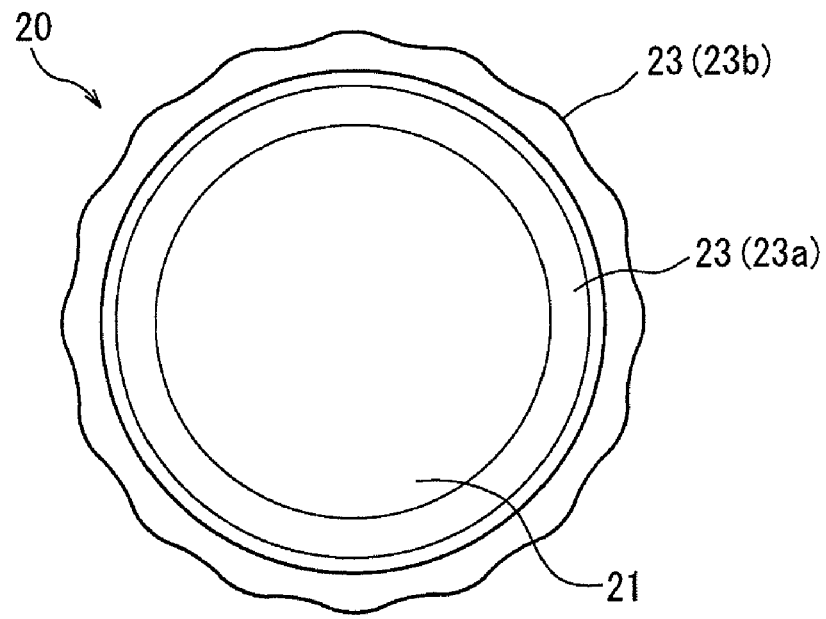
FIG. 4 is a plan view of the overcap of FIG. 3.

With the overcap 20 of the present invention as will be understood from FIG. 3, in particular, the cylindrical side wall 23 includes a small-diameter portion 23*a* positioned on the upper side and a large-diameter portion 23*b* positioned on the lower side. Here, it is important that a step 25 is formed on the inner surface of the cylindrical side wall 23 in the boundary portion between the small-diameter portion 23*a* and the large-diameter portion 23*b*.

That is, the overcap 20 is used being fitted onto the metal cap 50 shown in FIG. 8. Concretely, the overcap 20 is fixed onto the metal cap 50 by fitting the metal cap 50 comprising a metal such as aluminum or steel sheet into the inside of the cylindrical side wall 23.

The metal cap 50 includes a top plate 51 and a skirt 53. On the outer surface of the skirt 53, a knurling 55 is formed on the upper portion thereof extending in the axial direction. A groove 57 is annularly formed under the knurling 55, and a portion under the groove 57 is serving as a screw-forming region X of a flat surface. Under the screw-forming region X, further, a tamper evident band (TE band) 59 is formed. The TE band 59 is connected by a breakable bridge 60.

The above metal cap 50 is fitted onto the nozzle of a container in the above-mentioned form, and is caulked in this state by using a predetermined jig while a screw is formed on the screw-forming region X so as to engage with a thread formed on the outer surface of the container nozzle. Further, the lower portion of the TE band 59 is caulked so that the TE band 59 firmly engages with a flange portion formed on the outer surface of the container nozzle and the metal cap 50 is firmly fixed to the container nozzle. That is, if the metal cap 50 is turned in an opening direction, the metal cap 50 ascends accompanying the unscrewing motion while the TE band 59 is limited from ascending due to its engagement with the container flange portion. As a result, the metal cap 50 is removed from the container nozzle in a state where the bridge 60 connecting the TE band 59 is broken. Upon watching the state where the bridge 60 is broken, therefore, general customers are able to recognize the fact that the metal cap 50 has been opened.

The knurling 55 is formed to impart the function of preventing the slipping and makes it easy to grip the metal cap 50 facilitating the fitting of metal cap 50 onto the container nozzle in the step of production and enabling the metal cap 50 to be easily opened after the product has been sold.

Upon fitting the metal cap 50 into the cylindrical side wall 23, the overcap 50 (sic) of the present invention is fixed onto the metal cap 50. Here, however, since the step 25 has been formed on the inner surface of the cylindrical side wall 23, the metal cap 50 is prevented by the step 25 from completely entering into the cylindrical side wall 23. That is, as shown in FIG. 3, a gap D is maintained between the top plate 51 of the metal cap 50 fitted in the cylindrical side wall 23 and the IC tag 10 attached to the top panel 21 of the overcap 20. It will, therefore, be learned that in the present invention, a predetermined distance D is maintained between the IC tag 10 and the top plate 51 of the metal cap 50. Accordingly, transmission and reception of signals to and from the IC chip 5 in the IC tag 10 are not disturbed by the metal cap 50, permitting information such as content in the container to which the metal cap 50 is attached to be input to the IC tag 10 or to be output therefrom in a state where the overcap 20 is mounted on the metal cap 50.

In the invention described above, the step 25 may have such a size that the metal cap 50 fitted in the large-diameter portion 23b on the lower side of the cylindrical side wall 23 is reliably prevented from moving into the small-diameter portion 23a on the upper side thereof. From the above point of view, the inner diameters of the cylindrical side wall 23 (inner diameters of the small-diameter portion 23a and the large-diameter portion 23b) are set. Further, the position of the step 25 is so set that the distance D between the IC tag 10 (particularly, the metal antenna 3 in the IC tag 10) and the top plate 51 of the metal cap 50 that is fitted is long enough for the signals transmitted to, and received by, the IC chip 5 to be not disturbed by the metal cap 50; i.e., the distance D is, generally, set to be at least 2 mm or longer. Namely, the height of the small-diameter portion 23a is so set as to maintain the above distance D.

With the overcap of the present invention as shown in FIGS. 3 and 6, further, it is desired to form the knurling 27 on the inner surface of the large-diameter portion 23a(sic) of the cylindrical side wall 23 on the upper portion thereof (near the step 23 (sic)) so as to extend in the axial direction. That is, in fitting the metal cap 50 into the cylindrical side wall 23 of the overcap 20, the knurling 27 effectively avoids the close contact between the inner surface of the cylindrical side wall 23 and the outer surface of the skirt 53 of the metal cap 50, and enables the fitting operation to be smoothly conducted.

Further, formation of the knurling 27 gives an advantage of improved openability of the metal cap 50. As described earlier, the metal cap 50 fitted onto the container nozzle is removed by turning the metal cap 50 in the opening direction so as to be unscrewed from the container nozzle. In doing so, the bridge 60 must be broken requiring a large torque for opening posing, difficulty for aged persons and children. However, the knurling 27 that is formed comes in mesh with the knurling 55 formed on the outer surface of the skirt 51 (sic) of the metal cap 50. Upon turning the overcap 20 in the opening direction in the state of being mounted, therefore, the metal cap 50 can be turned integrally therewith in the opening direction. That is, the metal cap 50 is turned by turning the overcap 20 having a diameter larger than that of the metal cap 50 and, therefore, the metal cap 50 can be easily removed with a small force.

In the overcap 20 of the invention as shown in FIGS. 3 and 7, further, it is desired that engaging protrusions 29 are formed on the inner surface of the cylindrical side wall 23 (large-diameter portion 23b) at positions under the knurling 27 maintaining a suitable distance in the circumferential direction. That is, the engaging protrusions 29 engage with the annular groove 57 formed in the skirt 53 of the metal cap 50 fitted into the cylindrical side wall 23 (large-diameter portion 23b) whereby the overcap 20 is stably held and is effectively prevented from escaping the metal cap 50.

Figure 5:
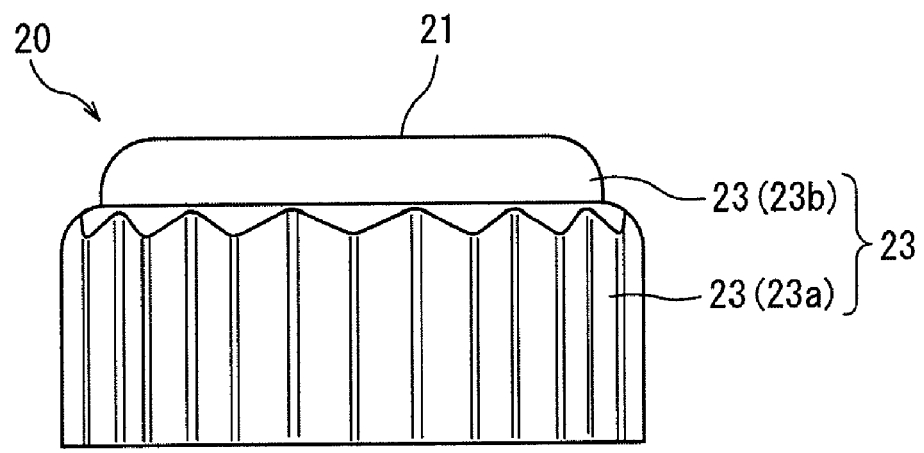
FIG. 5 is a side view of the overcap of FIG. 3.

As shown in FIGS. 5, 6 and 7, it is desired that the outer surface of the cylindrical side wall 23 of the overcap 20 and, particularly, the outer surface of the large-diameter portion 23b is of a corrugated form in which concave surfaces and convex surfaces are alternately formed extending in the axial direction. This makes it easy to grip the overcap 20 facilitating the operation for mounting the overcap 20 on the metal cap 50 (for fitting the metal cap 50) and enabling the overcap 20 to be easily turned in the opening direction by gripping the outer surface of the overcap 20.

The overcap 20 of the invention can be designed in a variety of ways so far as a predetermined distance D is maintained between the IC tag 10 attached to the top panel 21 and the top plate 51 of the metal cap 50 fitted in the cylindrical side wall 23. Another such example is shown in a side sectional view of FIG. 9.

Figure 9:
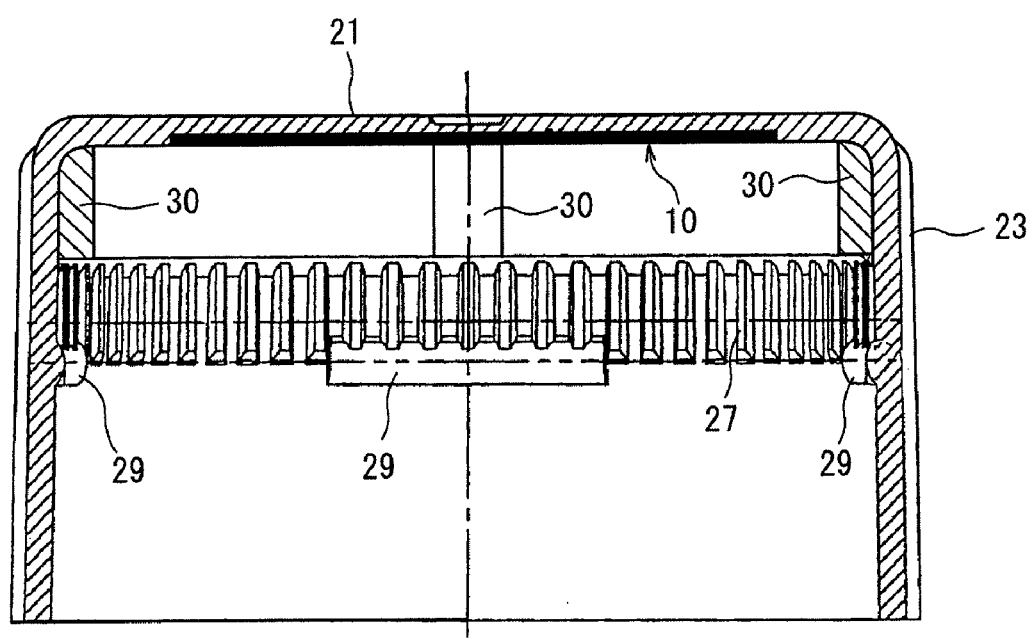
FIG. 9 is a side sectional view showing another resin overcap of the invention.

That is, the overcap 20 of FIG. 9 has the cylindrical side wall 23 that is formed substantially straight. Therefore, though the step 25 of the overcap 20 shown in FIGS. 3 to 7 is not formed, a plurality of vertical ribs 30 (i.e., axially extending protrusions) are formed instead extending from the upper end on the inner surface of the cylindrical side wall 23 down to near the upper portion of the knurling 27 maintaining a distance in the circumferential direction. That is, the vertical ribs 30 have the same function as the step 25 of the overcap 20. Provision of the vertical ribs 30, too, makes it possible to effectively prevent the metal cap 50 fitted in the cylindrical side wall 23 from entering into near the top panel 21. Thus, the predetermined distance D is maintained between the IC tag 10 and the top plate 51 of the metal cap 50, transmission and reception of signals to, and from, the IC chip 5 in the IC tag 10 are not disturbed by the metal cap 50, information can be reliably input to, and output from, the IC chip 5 making it possible to effectively utilize the IC tag 10.

With the exception of forming the vertical ribs 30 instead of the step 25, the overcap 20 of FIG. 9 has substantially the same structure as the overcap of FIGS. 3 to 7. Therefore, other portions are represented by the same reference numerals.

The above overcap 20 of the invention is generally mounted or capped on the metal cap 50 just after formed by using a suitable jig, and is sold. The overcap 20 is removed when the metal cap 50 is to be mounted on the container nozzle. The metal cap 50 mounted on the container nozzle is subjected to a predetermined caulking work to form a screw on the screw-forming region X. Thereafter, the overcap 20 is fitted onto the metal cap 50 again. In this case, if the height of the overcap 20 (length of the cylindrical side wall 23) is shortened enabling the screw-forming region X to be exposed in the state where the overcap 20 is fitted onto the metal cap 50, then the metal cap 50 can be mounted on the container nozzle and caulked in the state where the overcap 20 is being mounted thereon.

Information can be input to, or output from, the IC chip 5 of the IC tag 10 at any step such as in a step where the overcap 20 is being fitted onto the metal cap 50. Therefore, the overcap 20 of the present invention is very useful from the standpoint of productivity and managing the production.

The metal cap to which the above overcap of the invention is applied is chiefly used as a lid of containers such as glass bottles. The metal cap, however, can be favorably used as a lid for other containers, as a matter of course. The metal cap may be, for example, an SOT lid used for metal cans containing beverages in general, a re-sealable screw cap of metal cans, a tear-off type cap such as maxicap or rimple cap used for small containers such as cups containing sake and nourishing drinks, lids such as EOE, crown or white cap used for cans containing foods. Therefore, the overcap of the present invention can be applied to metal caps for a variety of uses.

DESCRIPTION OF REFERENCE NUMERALS

10: IC tag
20: overcap
21: top panel
23: cylindrical side wall
25: step
30: vertical ribs

The invention claimed is:

1. A resin overcap used being fitted onto a metal cap, comprising:
   a top panel and a cylindrical side wall hanging down from a circumferential edge of the top panel and in which the metal cap is fitted;
   wherein a step or a protrusion is formed on an upper portion on an inner surface of said cylindrical side wall to prevent an upward motion of the metal cap fitted in said cylindrical side wall; and
   an IC tag provided with an IC chip is mounted on said top panel in a manner of maintaining a predetermined distance D to a top plate of the metal cap fitted into said cylindrical side wall.

2. The resin overcap according to claim 1, wherein a knurling is formed on the inner surface of said cylindrical side wall at a position under said step.

3. The resin overcap according to claim 1, wherein an engaging protrusion is formed on the inner surface of said cylindrical side wall so as to engage with an outer surface of a skirt of the metal cap.

4. The resin overcap according to claim 1, wherein said IC tag is so mounted on the top panel that the distance D is not less than 2 mm with respect to the top plate of the metal cap.

* * * * *